(12) United States Patent
Edmondson et al.

(10) Patent No.: US 7,872,657 B1
(45) Date of Patent: Jan. 18, 2011

(54) MEMORY ADDRESSING SCHEME USING PARTITION STRIDES

(75) Inventors: John H. Edmondson, Arlington, MA (US); James M. Van Dyke, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 782 days.

(21) Appl. No.: 11/454,362

(22) Filed: Jun. 16, 2006

(51) Int. Cl.
  G06F 12/02 (2006.01)
  G06F 13/00 (2006.01)
  G06F 13/28 (2006.01)
  G09G 5/399 (2006.01)

(52) U.S. Cl. .................. 345/544; 345/540; 345/571; 711/147; 711/153; 711/157

(58) Field of Classification Search .......... 345/543–544
See application file for complete search history.

(56) References Cited

U.S. PATENT DOCUMENTS 5,265,053 A * 11/1993 Naradone et al. .......... 365/193
5,301,288 A * 4/1994 Newman et al. .......... 711/202

(Continued)

OTHER PUBLICATIONS

D.Chiou, L. Rudolph, S. Devadas, B. S. Ang; Dynamic Cache Partitioning via Columnization; Technical Report, MIT, Nov. 1999.*

(Continued)

*Primary Examiner*—Kee M Tung
*Assistant Examiner*—Carlos Perromat
(74) *Attorney, Agent, or Firm*—Patterson & Sheridan, LLP

(57) ABSTRACT

Systems and methods for addressing memory where data is interleaved across different banks using different interleaving granularities improve graphics memory bandwidth by distributing graphics data for efficient access during rendering. Various partition strides may be selected to modify the number of sequential addresses mapped to each DRAM and change the interleaving granularity. A memory addressing scheme is used to allow different partition strides for each virtual memory page without causing memory aliasing problems in which physical memory locations in one virtual memory page are also mapped to another virtual memory page. When a physical memory address lies within a virtual memory page crossing region, the smallest partition stride is used to access the physical memory.

20 Claims, 8 Drawing Sheets

U.S. PATENT DOCUMENTS

| | | | | |
|---|---|---|---|---|
| 5,519,829 | A * | 5/1996 | Wilson | 345/530 |
| 5,802,604 | A * | 9/1998 | Stewart et al. | 711/206 |
| 6,125,437 | A * | 9/2000 | Buck-Gengler | 345/569 |
| 6,381,668 | B1 * | 4/2002 | Lunteren | 711/5 |
| 6,557,014 | B1 * | 4/2003 | Cellis et al. | 707/205 |
| 6,625,720 | B1 * | 9/2003 | Ansari | 712/4 |
| 6,631,447 | B1 * | 10/2003 | Morioka et al. | 711/141 |
| 6,694,407 | B1 * | 2/2004 | May et al. | 711/129 |
| 6,853,382 | B1 * | 2/2005 | Van Dyke et al. | 345/544 |
| 6,895,491 | B2 * | 5/2005 | Kjos et al. | 711/203 |
| 6,992,673 | B2 * | 1/2006 | Oka et al. | 345/531 |
| 6,999,088 | B1 * | 2/2006 | Van Dyke et al. | 345/544 |
| 7,281,249 | B2 * | 10/2007 | Tarui et al. | 718/102 |
| 7,318,114 | B1 * | 1/2008 | Cypher | 711/3 |
| 7,389,398 | B2 * | 6/2008 | Garney | 711/173 |
| 7,409,694 | B2 * | 8/2008 | Forin et al. | 719/331 |
| 7,437,517 | B2 * | 10/2008 | da Silva et al. | 711/141 |
| 2002/0085010 | A1 * | 7/2002 | McCormack et al. | 345/545 |
| 2003/0138152 | A1 * | 7/2003 | Fenney | 382/240 |
| 2004/0012600 | A1 * | 1/2004 | Deering et al. | 345/506 |
| 2004/0117595 | A1 * | 6/2004 | Norris et al. | 711/214 |
| 2005/0055536 | A1 * | 3/2005 | Ansari | 712/4 |
| 2005/0160210 | A1 * | 7/2005 | Watt et al. | 710/269 |
| 2006/0179236 | A1 * | 8/2006 | Shafi | 711/137 |
| 2007/0050593 | A1 * | 3/2007 | Chen et al. | 711/202 |
| 2007/0094477 | A1 * | 4/2007 | Espasa et al. | 711/217 |
| 2007/0174671 | A1 * | 7/2007 | Zohar et al. | 714/6 |
| 2007/0195613 | A1 * | 8/2007 | Rajan et al. | 365/189.05 |
| 2008/0195890 | A1 * | 8/2008 | Earhart et al. | 714/6 |
| 2009/0031105 | A1 * | 1/2009 | Hansen et al. | 712/27 |

OTHER PUBLICATIONS

N. Matloff; Memory Interleaving; Department of Computer Science; University of California at Davis; Nov. 2003.*

* cited by examiner

MEMORY ADDRESSING SCHEME USING PARTITION STRIDES

BACKGROUND OF THE INVENTION

1. Field of the Invention

Embodiments of the present invention generally relate to mapping physical memory addresses to DRAM (dynamic random access memory) memory locations and, more specifically, to interleaving the DRAM memory locations using partition strides for efficient access.

2. Description of the Related Art

Conventional multithreaded processing systems for graphics processing use off-chip memory to store image data and texture map data. A frame buffer memory constructed of DRAM devices is used to store the image data and texture map data. When multiple DRAM devices are used it is desirable to store portions of the image data or texture map data in each of the DRAM devices in order to access the portions in parallel. Therefore, more data may be read or written in a single clock cycle to optimize the available memory bandwidth between the frame buffer memory and the graphics processor.

FIG. 1 illustrates a prior art block diagram of DRAM memory 100. The basic unit of DRAM organization is a bank, such as banks 120-0, 120-1, 120-2, and 120-3 of DRAM memory 100. Each bank 120 has a single row buffer to store a row of data to be written to or that was read from the bank. Row address 115 is used to select a single row from each bank to load into each row buffer 110 for a read operation or to load from each row buffer 110 for a write operation. Column address 116 selects a portion of a row stored in each row buffer 110. A conventional DRAM memory 100 is configured with 2 Kbytes per row and column address 116 selects 16 bytes of the 2 Kbyte row for output to or input from data 105.

Moving data from a bank 120 to a row buffer 110 requires an activate operation. Similarly, moving data from a row buffer 110 to a bank 120 requires a precharge operation. There is a minimum delay for switching between activate and precharge operations that is typically several clock cycles. Therefore, it is desirable to complete all read and/or write operations for a particular row before switching to a different row.

Furthermore, because the data bus for transporting data 105 is shared it is desirable to read or write row buffers 110 in contiguous clock cycles. Interleaving read and write operations for each bank will lower performance due to the overhead required to change the direction of the shared bus to transition from reads to writes or from writes to reads. Spreading a sequence of read operations or write operations across banks 120 permits hiding of activate or precharge operations. For example, during a read sequence, data loaded into row buffer 110 corresponding to bank 120-0 may be output as data 105 while bank 120-1 is precharged for a subsequent read in the sequence. When different rows of the same bank are accessed the precharge and activate delays cannot be hidden.

Accesses may be spread across banks 120 by interleaving data for a graphics surface, such as a texture map or image. As a scanline is traversed during rendering banks 120 are accessed in sequence. Similarly, as a texture map is read portions of data may be read from each bank 120. It is desirable to modify the granularity of the interleaving depending on surface characteristics of each graphics surface, such as the number of bits per pixel or texel. Accordingly, the memory addressing mechanism used to read and write a local memory embodied using DRAM memory to store graphics surfaces should allow different granularities of interleaving for different surface types.

SUMMARY OF THE INVENTION

The current invention involves new systems and methods for addressing memory where data is interleaved across different banks using different interleaving granularities. A physical address space is defined to address memory locations in DRAMs that are used to store graphics surfaces. The address space is divided into sets of sequential addresses that are each mapped to a single DRAM partition, producing an address space interleaved across the DRAM partitions. Each DRAM partition includes two DRAMs that are configured to function as a single larger DRAM and correspond to different sets of sequential addresses. The span in address space between one partition and the next is the partition stride. Each partition stride effectively specifies a portion (number of bytes) of each partition that is used to create a contiguous physical memory space equal to the partition stride scaled by the number of partitions. The equal portions of each one of the partitions are interleaved in a repeating pattern to fill a memory page. Increasing the partition decreases the frequency (in terms of bytes) at which the partition pattern is repeated to fill a physical memory page. For example, the pattern for 2 partitions is partition 0, partition 1, and the pattern for 4 partitions is partition 0, partition 1, partition 2, partition 3. As the pattern is repeated the partitions are interleaved to fill the physical memory page, spreading memory accesses across all of the partitions.

Various partition strides may be selected to modify the number of sequential addresses in each set and change the interleaving granularity. A memory addressing scheme is used to allow different partition strides for each virtual memory page without causing memory aliasing problems in which physical memory locations in one virtual memory page are also mapped to another virtual memory page. When a physical memory address lies within a virtual memory page crossing region, the smallest partition stride is used to access the physical memory.

Various embodiments of a method of the invention for addressing memory constructed of multiple partitions to access data stored within the memory include determining a physical address corresponding to the data stored within the memory, determining whether or not the physical address lies within a page crossing region between a first memory page having a minimum partition stride and a second memory page having a different partition stride, computing a partition number corresponding to one of the multiple partitions, and outputting the physical address to a portion of the memory corresponding to the partition number to read data from the memory or write data to the memory. The partition number is computed using the different partition stride when the physical address lies within the page crossing region. The partition number is computed using the minimum partition stride when the physical address lies within the page crossing region to avoid memory aliasing.

Various embodiments of the invention include a system for addressing memory constructed of multiple partitions. The system includes a virtual to physical address mapping unit, a first partition controller, and a second partition controller. The virtual to physical address mapping unit is configured to determine whether or not a physical address lies within a page crossing region between a first memory page having a minimum partition stride and a second memory page having a different partition stride and compute a partition number corresponding to one of the multiple partitions using the different partition stride when the physical address lies within the page crossing region and computing the partition number using the minimum partition stride when the physical address lies within the page crossing region to avoid memory aliasing. The first partition controller corresponds to a first partition number and is configured to receive physical addresses from the virtual to physical address mapping unit to read data from the memory or write data to the memory. The second partition controller corresponds to a second partition number and is configured to receive physical addresses from the virtual to physical address mapping unit to read data from the memory or write data to the memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Systems and methods for addressing memory where data is interleaved across different banks using different interleaving granularities may improve graphics memory bandwidth by distributing graphics data for efficient access during rendering. The frame buffer memory used to store image data and texture maps is divided into physical memory partitions, where each partition corresponds to the physical memory provided by a pair of DRAMs. Various partition strides may be selected to modify the number of sequential addresses mapped to each DRAM and change the interleaving granularity for each virtual memory page that is mapped to the frame buffer memory. A memory addressing scheme is used to allow different partition strides for each virtual memory page without causing memory aliasing problems in which physical memory locations in one virtual memory page are also mapped to another virtual memory page. When a physical memory address lies within a virtual memory page crossing region, the smallest partition stride is used to access the physical memory.

Figure 2A:
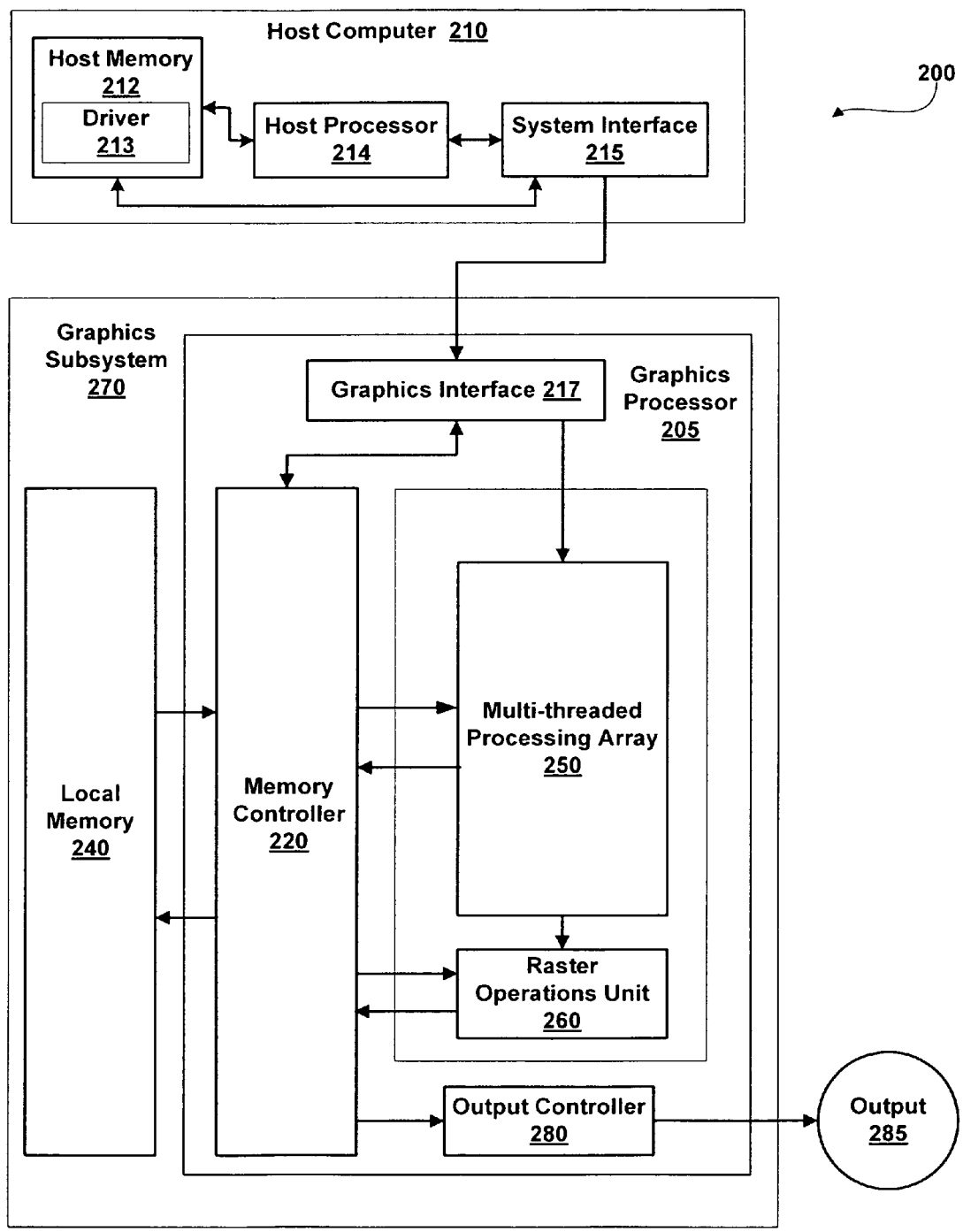
FIG. 2A illustrates a computing system including a host computer and a graphics subsystem in accordance with one or more aspects of the present invention.

FIG. 2A illustrates a computing system generally designated 200 including a host computer 210 and a graphics subsystem 270 in accordance with one or more aspects of the present invention. Computing system 200 may be a desktop computer, server, laptop computer, personal digital assistant (PDA), palm-sized computer, tablet computer, game console, cellular telephone, computer based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212.

A graphics device driver, driver 213, interfaces between processes executed by host processor 214, such as application programs, and a programmable graphics processor 205, translating program instructions as needed for execution by graphics processor 205. Driver 213 also uses commands to configure sub-units within graphics processor 205. Specifically, driver 213 programs page table entries used to translate between virtual memory addresses and physical memory addresses. Driver 213 also allocates portions of local memory 240 used to store graphics surfaces including image data and texture maps.

Host computer 210 communicates with graphics subsystem 270 via system interface 215 and a graphics interface 217 within a graphics processor 205. Data received at graphics interface 217 can be passed to a multi-threaded processing array 250 or written to a local memory 240 through memory controller 220. Graphics processor 205 uses graphics memory to store graphics data and program instructions, where graphics data is any data that is input to or output from components within the graphics processor. Graphics memory can include portions of host memory 212, local memory 240, register files coupled to the components within graphics processor 205, and the like.

Graphics processor 205 receives commands from host computer 210 via graphics interface 217. Some of the commands are used by multi-threaded processing array 250 to initiate processing of data by providing the location of program instructions or graphics data stored in memory. Multi-threaded processing array 250 and a raster operations unit 260 each include an interface to memory controller 220 through which program instructions and data can be read from memory, e.g., any combination of local memory 240 and host memory 212.

Multi-threaded processing array 250 optionally reads processed data, e.g., data written by raster operations unit 260, from memory and performs additional operations on the processed data before outputting the further processed data to raster operations unit 260. Multi-threaded processing array 250 and raster operations unit 260 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Multi-threaded processing array 250 and raster operations unit 260 are each optionally configured such that data processing operations are performed in multiple passes through those units or in multiple passes within Multi-threaded processing array 250. Multi-threaded processing array 250 and raster operations unit 260 each include a read interface to memory controller 220. Raster operations unit 260 also includes a write interface to memory controller 220 through which data can be written to memory.

In a typical (implementation, multi-threaded processing array 250 performs geometry computations, rasterization, and pixel computations. Therefore, multi-threaded processing array 250 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by multi-threaded processing array 250 are passed to raster operations unit 260, which optionally performs near and far plane clipping and raster operations, such as stencil, z test, and the like, and saves the results or the samples output by multi-threaded processing array 250 in local memory 240. When the data received by graphics subsystem 270 has been completely processed by graphics processor 205, an output 285 of graphics subsystem 270 is provided using an output controller 280. Output controller 280 is optionally configured to deliver data to a display device, network, electronic control system, other computing system 200, other graphics subsystem 270, or the like. Alternatively, data is output to a film recording device or written to a peripheral device, e.g., disk drive, tape, compact disk, or the like.

Figure 2B:
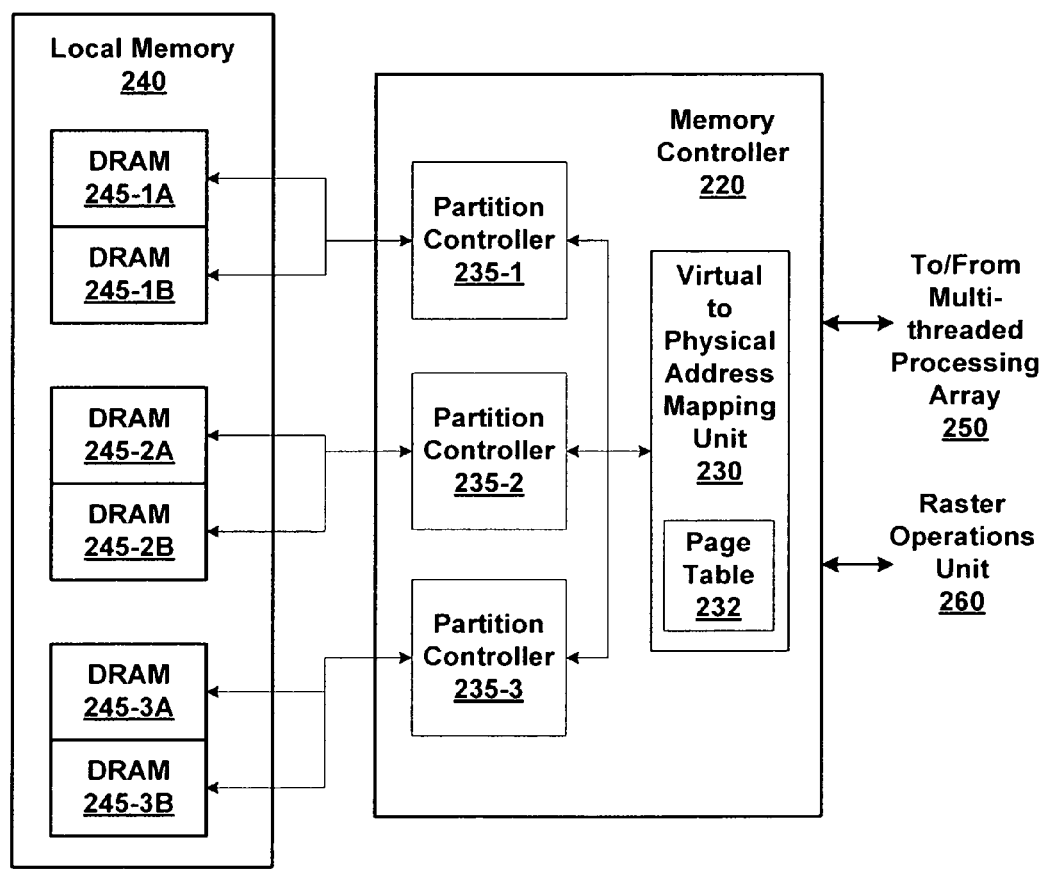
FIG. 2B illustrates memory controller 220 and local memory 240 of FIG. 2A in accordance with one or more aspects of the present invention.

FIG. 2B illustrates memory controller 220 and local memory 240 of FIG. 2A in accordance with one or more aspects of the present invention. Memory controller 220 includes a virtual to physical address mapping unit 230 that translates virtual addresses received from multithreaded processing array 250 and raster operations unit 260 into physical addresses in graphics memory. Virtual to physical address mapping unit 230 includes a page table 232 that stores information used to perform the translation, e.g., partition stride, surface compression format, virtual memory page to physical memory page mapping, DRAM configuration information, and the like. A portion of a virtual address is used to access an entry of page table 232 and obtain an address of a virtual page in physical memory.

In some embodiments of the present invention the virtual address space is divided into virtual pages which can be either 4 Kbytes or 64 Kbytes. A virtual page describes a region of virtual memory with common properties that maps to a contiguous region of physical memory. Based on the virtual page size, a 40 bit virtual address can be broken into the following fields for 4 Kbyte virtual pages:

Bits [7:0]: Specify the byte within a 256 byte physical region.
Bits [11:8]: Specify the 256 byte physical region within the 4 Kbyte virtual page.
Bits [39:12]: Specify the virtual page address.

The 40 bit virtual address can be broken into the following fields for 64 Kbyte virtual pages:

Bits [7:0]: Specify the byte within a 256 byte physical region.
Bits [15:8]: Specify the 256 B physical region within the 64 Kbyte virtual page.
Bits [39:16]: Specify the virtual page address.

When the physical address is in local memory 240, the physical address is converted into a partition number and RBC (row-bank-column) address within a DRAM 245. The DRAMs 245 coupled to a partition controller 235 are also referred to as a partition, e.g., DRAM 245-1A and DRAM 245-1B are a partition. Each partition controller 235 corresponds to a unique partition number. Each partition controller 235 is coupled to a pair of DRAMs 245. For example a first partition controller 235-1 is coupled to DRAM 245-1A and DRAM 245-1B. A second partition controller 235-2 is coupled to DRAM 245-2A and DRAM 245-2B and a third partition controller 235-3 is coupled to DRAM 245-3A and DRAM 245-3B. In some embodiments of the present invention, memory controller 220 may include one or more partitions with each partition controller 235 including a multi-bit, e.g., 32 bit, 64 bit, or the like, interface to local memory 240. When a manufacturing defect prevents a particular partition controller 235 from functioning properly or when a DRAM 245 is not populated, a number of active (functional) partitions may be updated accordingly and stored in virtual to physical address mapping unit 230. Therefore, memory controller 220 may be configured to best utilize the portions of local memory 240 that are available.

Figure 1:
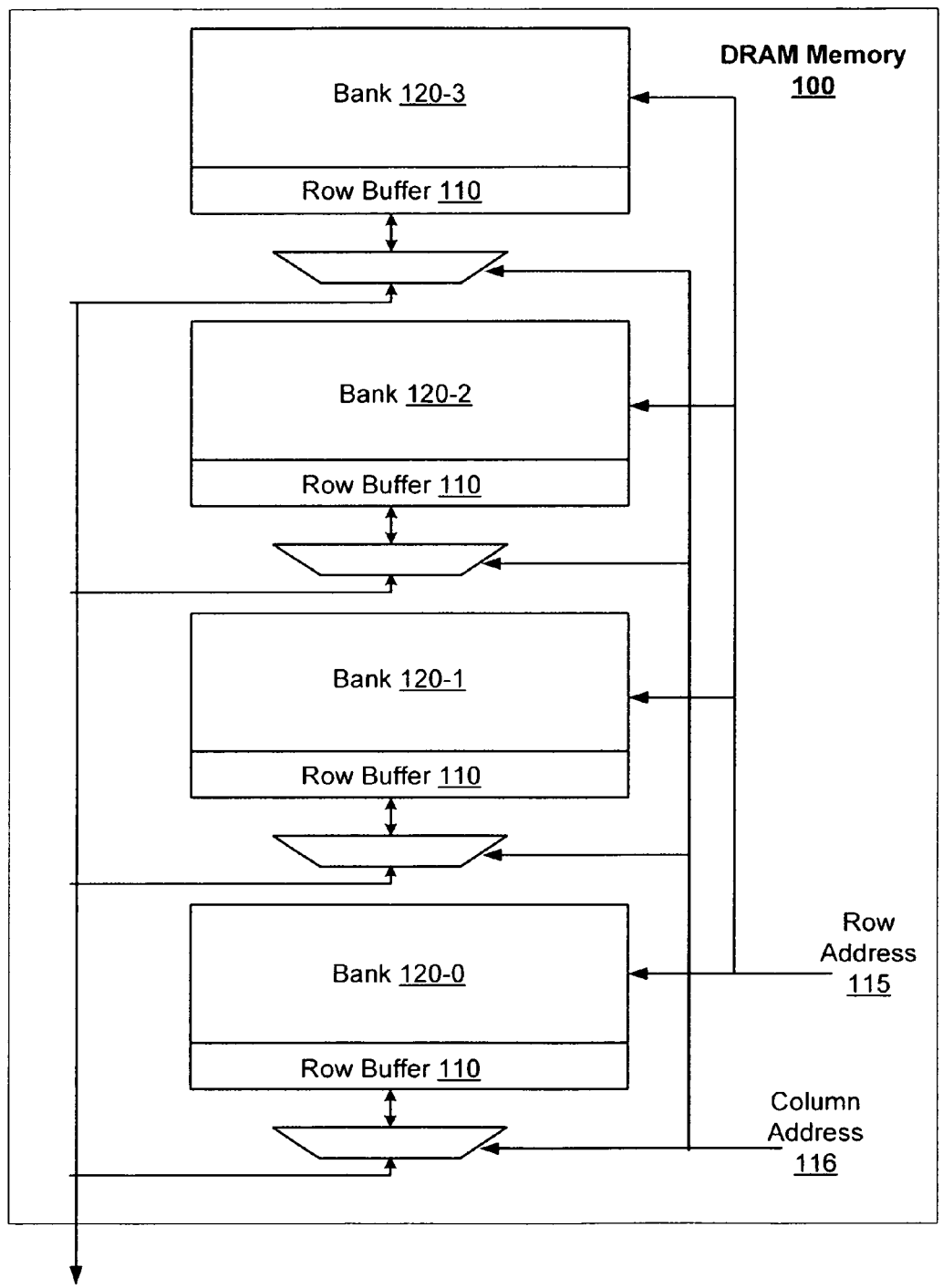
FIG. 1 illustrates a prior art block diagram of DRAM (dynamic random access memory) memory 100.
Figure 3A:
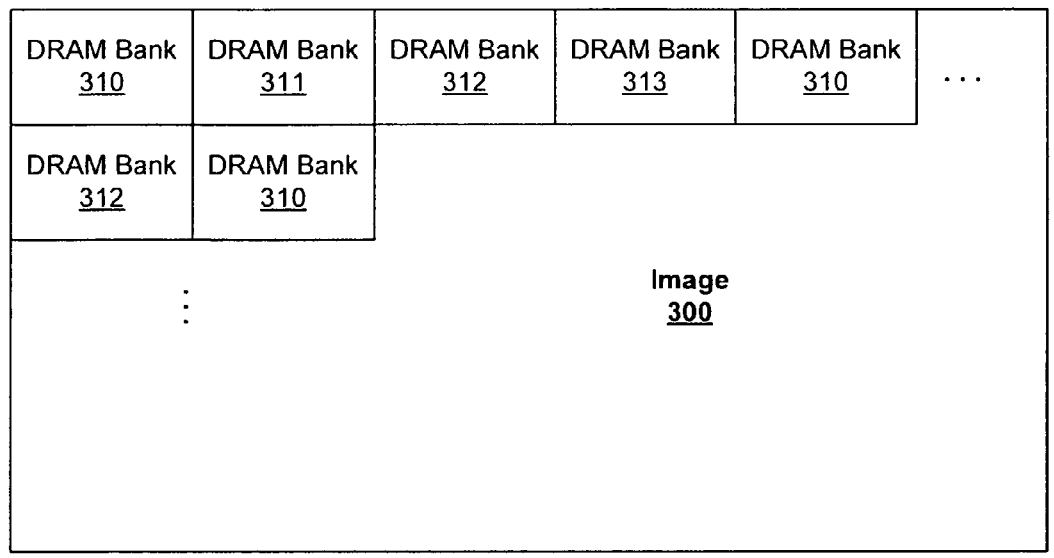
FIG. 3A illustrates a conceptual diagram of a mapping of DRAM banks to a two-dimensional image in accordance with one or more aspects of the present invention.

Portions of a graphics surface are stored in each partition to distribute the data for more efficient access. This distribution results in greater bandwidth utilization and higher performance for memory bandwidth limited functions, such as texture mapping. Each DRAM 245 in local memory 240 is configured to store data in separate banks of memory, as previously described in conjunction with FIG. 1. FIG. 3A illustrates a conceptual diagram of a mapping of DRAM banks to a two-dimensional image 300, in accordance with one or more aspects of the present invention. Each DRAM 245 may include 2, 4, and 8 or more memory banks that each contain pages. The effective size of one page in a bank, i.e., bank page size, is $2^{(w+colBits)}$, where w is the log base 2 of the data bus width of a DRAM 245 in bytes and colBits is the number of column bits in a DRAM 245. The interleave pattern resulting when a single partition stride is applied across partitions is much smaller than the bank page size. Therefore, the same bank in all partitions can be considered to be a superpage distributed over the partitions.

In FIG. 3A DRAM bank 310 is a first bank of DRAMs 245 of FIG. 2B, DRAM bank 311 is a second bank, DRAM bank 312 is a third bank, and DRAM bank 313 is a fourth bank. The memory entries of each bank page are mapped onto a two-dimensional portion of image 300. A superpage is distributed across image 300 as several DRAM banks 310, 311, 312, and 313. The distribution of data over different banks allows the precharge and activate delays to be hidden as an image is accessed in a horizontal or vertical pattern.

Figure 3B:
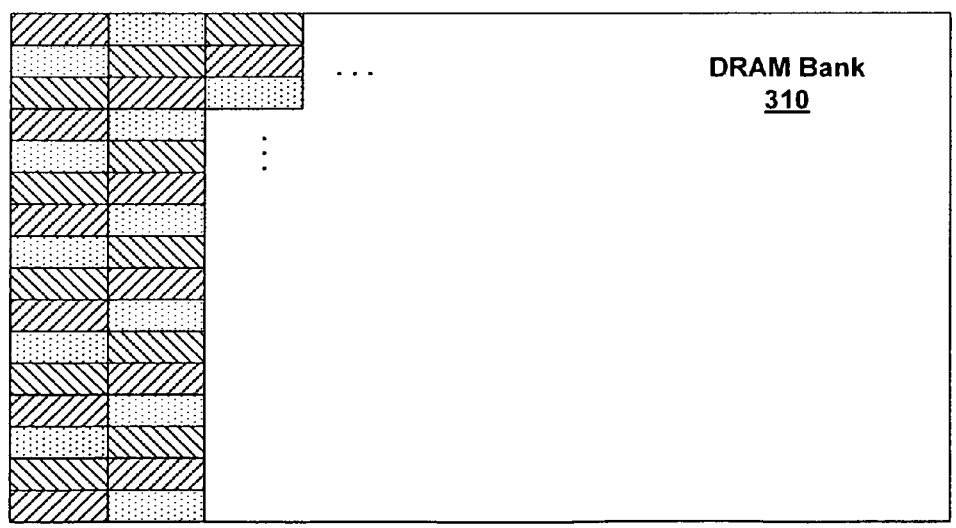
FIG. 3B illustrates a conceptual diagram of partition interleaving for a DRAM bank from FIG. 3A in accordance with one or more aspects of the present invention.

Each DRAM bank 310, 311, 312, or 313 includes rows in each of the partitions. FIG. 3B illustrates a conceptual diagram of partition interleaving for DRAM bank 310 of FIG.

3A, in accordance with one or more aspects of the present invention. Each of the three patterns shown in DRAM bank 310 represents a different partition. Each patterned box includes several DRAM entries storing a number of bytes that is the partition stride. For example, when the partition stride is 256 bytes, the partition number changes for each 256 bytes of data stored sequential physical addresses in local memory 240. In some embodiments of the present invention, a partition stride of 256 bytes or 1024 bytes may be selected.

Each physical memory page begins at a particular partition, but different pages begin at different partitions when the number of partitions is not a power of 2, i.e., the number of partitions does not equal $2^i$, where i is an integer. Specifically, the starting partition number, Pstart, for a physical 64 Kbyte page can be computed by dividing the physical byte address of the page start by the partition stride, and taking the result modulo the number of partitions, i.e., Pstart=(page physical address/partition stride) mod (number of partitions).

Each byte address within a physical page is mapped to a partition, P, according to the following formula: P=(physical address/partition stride) mod (number of partitions). Within each partition, DRAM data storage locations are addressed by a DRAM address. The DRAM address is sequential within the DRAM partition with one address for each location in DRAM. The DRAM address corresponding to a physical address is found by the following formula: DRAM address=partition stride*(physical address/partition stride)/number of partitions+physical address mod (partition stride).

Figure 4A:
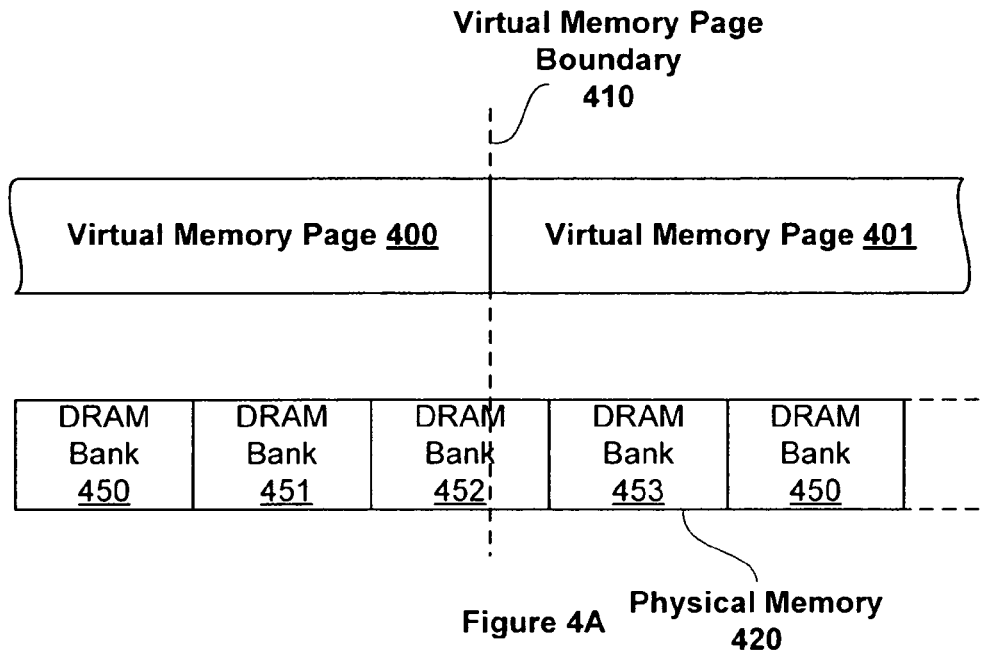
FIG. 4A illustrates the correspondence between virtual memory pages and DRAM banks in accordance with one or more aspects of the present invention.

FIG. 4A illustrates the correspondence between virtual memory pages 400 and 401 and DRAM banks 450, 451, 452, and 453, in accordance with one or more aspects of the present invention. Each virtual memory page is mapped to some physical memory page and the mapping information is stored in page table 232. Sequential virtual memory pages are not required to be mapped to sequential physical memory pages. Therefore, the starting partition of a virtual page is not known until the physical page that it maps to is specified, and the distribution of bytes in that virtual page to partitions is similarly not known until the physical page is specified. Furthermore, some possible number of partitions, e.g., 3, 5, or 6, do not divide evenly into a virtual page size, resulting in a virtual page that does not include an equal number of bytes in each partition, as shown in FIG. 4A.

A virtual memory page boundary 410 separates virtual memory page 400 and virtual memory page 401 that are mapped to portions of physical memory 420. Physical memory 420 includes four DRAM banks, DRAM bank 450, DRAM bank 451, DRAM bank 452, and DRAM bank 453. Virtual memory page 400 ends and virtual memory page 401 begins within the same DRAM bank 452.

Figure 4B:
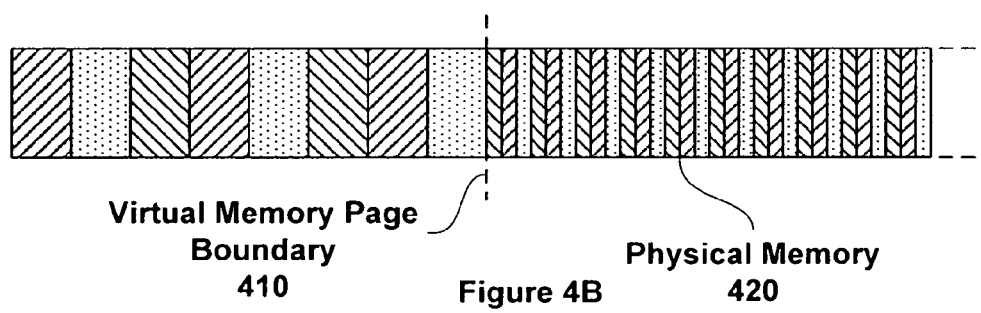
FIG. 4B illustrates the correspondence between virtual memory pages and partition strides in accordance with one or more aspects of the present invention.

FIG. 4B illustrates the correspondence between virtual memory pages 400 and 401 and partition strides, in accordance with one or more aspects of the present invention. Because there are three partitions, each indicated by a unique pattern, every third virtual memory page boundary is aligned with a DRAM bank. In order to improve access performance between graphics processor 205 and local memory 240, different graphics surfaces may use different partition strides. In particular, the 1024 byte partition stride may improve bank locality for texture map surfaces and reduce the frequency of row-page access conflicts in DRAM banks. Therefore, a partition stride may be specified for each virtual memory page allocated to the graphics surfaces. Consequently, memory location aliasing may result when the partition stride changes within a DRAM bank, i.e., when a virtual memory page boundary intersects a DRAM bank. Memory locations within a portion of DRAM bank 452 allocated to virtual memory page 400 may also be accessed through virtual memory page 401 resulting in data corruption.

A solution to avoid memory location aliasing is to only allocate virtual memory pages in groups of N virtual memory pages where N is the number of partitions. However, increasing the minimum virtual memory page allocation size for each graphics surface may decrease the number of graphics surfaces that are stored in local memory 240. In particular, a smaller minimum allocation size is desirable to efficiently store many small texture maps.

Figure 4C:
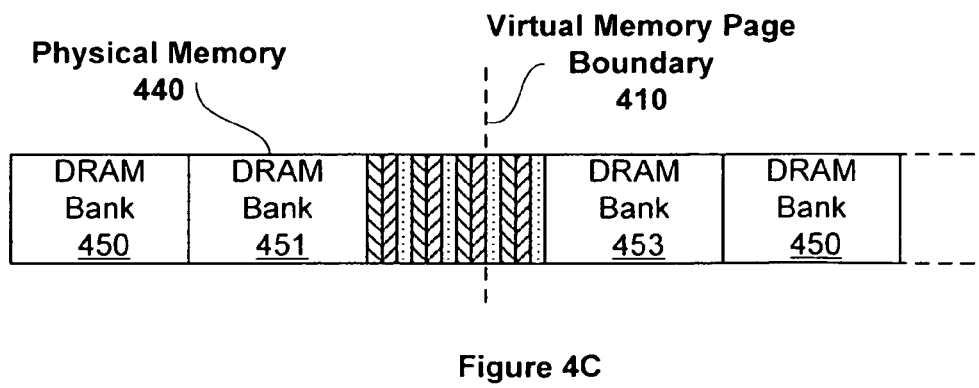
FIG. 4C illustrates constraining the partition stride within a virtual page crossing region in accordance with one or more aspects of the present invention.

FIG. 4C illustrates constraining the partition stride within a virtual page crossing region, in accordance with one or more aspects of the present invention. The bulk of each virtual page may use the specified partition stride and the minimum partition stride is used within the virtual page crossing region. Therefore, the minimum virtual memory page allocation size is the size of a single virtual memory page and each virtual memory page may use a particular partition stride as desired.

When a physical memory address is "near" virtual memory page boundary 410 and the virtual memory pages 400 and 401 use different partition strides, the partition stride reverts to the minimum partition stride for the DRAM bank intersected by the virtual memory page boundary 410. When a virtual memory page boundary is coincident with a DRAM bank boundary there is no need to revert to the minimum partition stride since memory location aliasing does not occur. Therefore, the partition stride for the page crossing region, i.e., DRAM bank 452, reverts to the minimum partition stride of 256 bytes. The bulk of virtual memory page 400 uses a larger partition stride and the portion of virtual memory page 400 within the page crossing region uses the minimum partition stride to avoid memory location aliasing. The partition stride for virtual memory page 401 is the minimum partition stride of 256 bytes, therefore the partition stride for virtual memory page 401 remains unchanged within the page crossing region.

Figure 5:
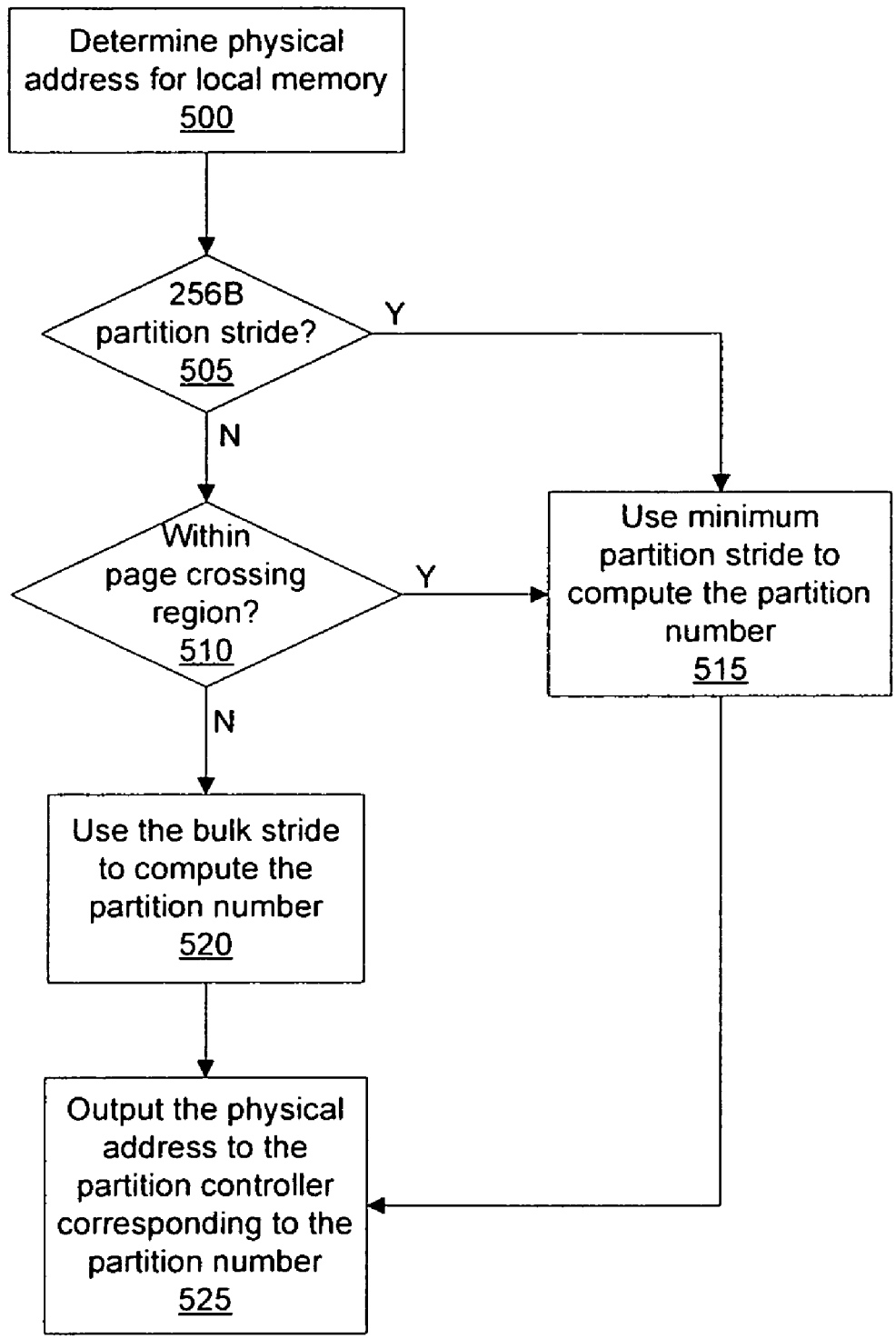
FIG. 5 illustrates a flow diagram of an exemplary method of determining the partition number using the physical address in accordance with one or more aspects of the present invention.

FIG. 5 illustrates a flow diagram of an exemplary method of determining the partition number using the physical address, in accordance with one or more aspects of the present invention. In step 500 virtual to physical address mapping unit 230 has computed a physical address from the virtual address. The higher-order address bits (Physical Address[n-1:16] for 64 Kbyte pages) are read from page table 232. By storing the result of the modulo on these bits in the page table at the time the page table entry is loaded, the computation which must be performed on an arbitrary request within the page can be simplified. In step 505 virtual to physical address mapping unit 230 determines if the entry in page table 232 corresponding to the virtual address indicates that the partition stride for the virtual memory page is 256 bytes. If, in step 505 virtual to physical address mapping unit 230 determines that the partition stride is not 256 bytes, then the partition stride is 1024 bytes, and in step 510 virtual to physical address mapping unit 230 determines if the physical address is within a page crossing region.

TABLE 1 specifies the page crossing regions that require using the minimum partition stride to compute the partition number when the virtual memory page size is 64 Kbytes. PA is bits 15 through 10 of the physical address. Although TABLE 1 lists the page crossing regions for 64 Kbyte page sizes and 1 through 6 partitions, those skilled in the art can determine page crossing regions for other page sizes and number of partitions.

TABLE 1

Page Crossing Regions

| Number of partitions | Physical address[N-1:8] mod (partition number at the start of the page) | Page crossing region at the start of the page | Page crossing region at the end of the page |
|---|---|---|---|
| 6 | 0 | 0 | PA > 59 |
| 6 | 4 | PA < 2 | PA > 61 |
| 6 | 2 | PA < 4 | 0 |
| 5 | 0 | 0 | PA > 59 |
| 5 | 1 | PA < 1 | PA > 60 |
| 5 | 2 | PA < 2 | PA > 61 |
| 5 | 3 | PA < 3 | PA > 62 |
| 5 | 4 | PA < 4 | 0 |
| 3 | 0 | 0 | PA > 62 |
| 3 | 1 | PA < 2 | PA > 61 |
| 3 | 2 | PA < 1 | 0 |
| 1, 2, 4 | 0 | 0 | 0 |

In summary, TABLE 1 may be used to determine a minimum span of memory that includes a virtual memory page boundary, i.e., the page crossing region. When the virtual memory page boundary is coincident with a superpage boundary, then the page crossing region is zero. Otherwise, the page crossing region includes each of the partitions once, using the larger of the two partition strides on either side of the virtual memory page boundary. The page crossing region size is equal to the product of the number of partitions and the larger partition stride. Therefore, the page crossing region includes N of the smaller partition strides for each partition, where N is the larger partition stride divided by the smaller partition stride. When more than two partition strides are in use, the page crossing region includes M of the smallest partition strides, where M is the larger partition stride divided by the smallest partition stride. Because the partition strides are each multiples of the smallest partition stride, the page crossing region includes an equal number of each of the partitions, allowing for the data to be distributed between the different partitions for efficient access.

If in step 510 virtual to physical address mapping unit 230 determines that the physical address is not within the page crossing region, then in step 520 virtual to physical address mapping unit 230 uses the bulk partition stride (1024 bytes) to compute the partition number. Partition number [2:0]=(PA+(Partition Offset)) % (number of partitions). Partition Offset is the pre-computed partition number for the location at the start of the page in physical memory. The Partition Offset value is a property of the physical page that is calculated by virtual to physical address mapping unit 230 when storing an entry in page table 232.

If in step 510 virtual to physical address mapping unit 230 determines that the physical address is within the page crossing region, then in step 515 virtual to physical address mapping unit 230 uses the minimum partition stride to compute the partition number. In step 525 virtual to physical address mapping unit 230 outputs the physical address to the partition controller 235 corresponding to the partition number. Partition number [2:0]=((Physical Address[15:8])+(Partition Offset)) % (number of partitions), where % is the modulo function.

Figure 6A:
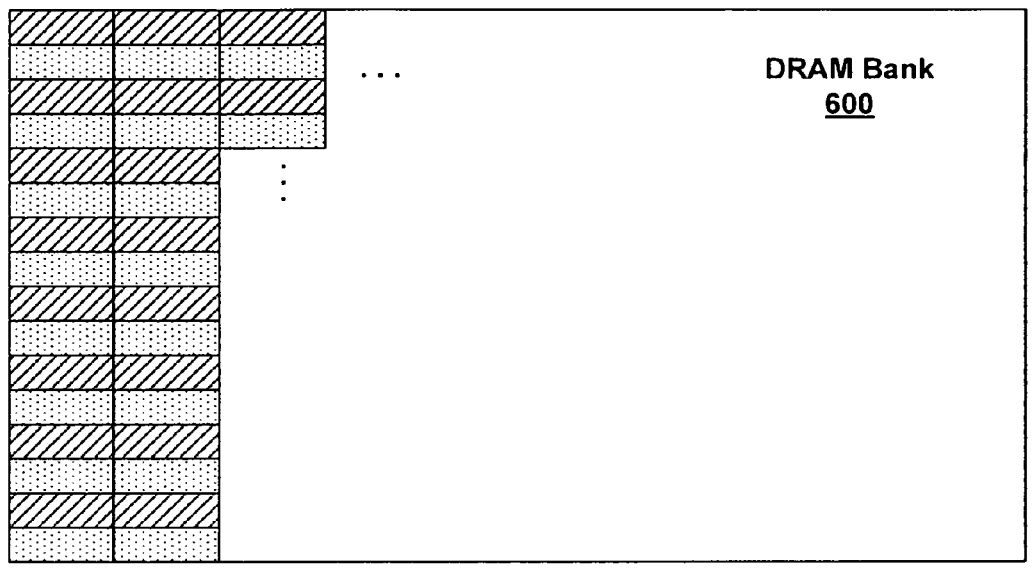
FIG. 6A illustrates a conceptual diagram of partition interleaving for another DRAM bank in accordance with one or more aspects of the present invention.

FIG. 6A illustrates a conceptual diagram of partition interleaving of two partitions for a DRAM bank 600, in accordance with one or more aspects of the present invention. The partition mapping for DRAM bank 600 works well when the number of partitions is 1, 3, 5 but when the number of partitions is divisible by 2, as shown in FIG. 6A, the mapping above is not optimal. The problem is load balancing into all partitions since sequential partitions are mapped vertically in a column before stepping horizontally in image space. Because the bank height is an even number of partitions, horizontally adjacent partitions in image space map to the same partition. In FIG. 6A different partitions, indicated by different patterns are mapped to DRAM bank 600 such that the same pattern is used for horizontally aligned partitions in image space. This results in poor performance since accesses in horizontal patterns would only utilize one partition.

Figure 6B:
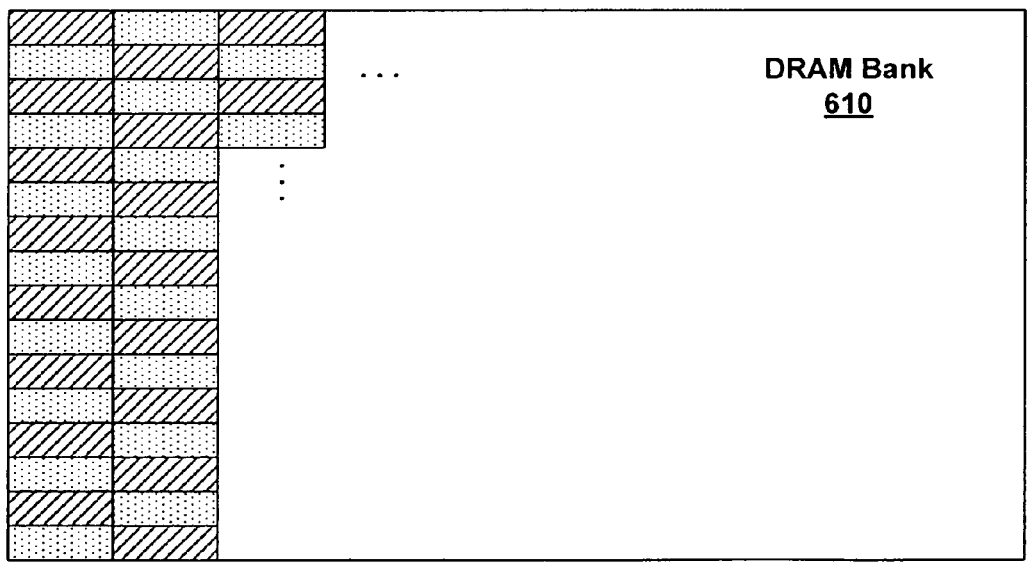
FIG. 6B illustrates a conceptual diagram of partition interleaving using a hash function for a DRAM bank in accordance with one or more aspects of the present invention.

FIG. 6B illustrates a conceptual diagram of partition interleaving of two partitions using a hash function for DRAM bank 610, in accordance with one or more aspects of the present invention. In order to perturb the partition mapping to prevent aligned partition mappings such as the one shown in FIG. 6A, the partition mapping equation may include a hash function. Using a hash function to perturb the partition mapping produces the partition mapping shown in FIG. 6B, where the same partition is not horizontally aligned in image space.

When the 256 byte partition stride is used the interleaving may be specified by the code shown in TABLE 2, where PA is the physical address and swz[4:0]=int(PA[n-1:8]/6)%32. Those skilled in the art will appreciate that the partition mapping can also be perturbed using similar equations to interleave other partition stride sizes and for other embodiments of the present invention, including embodiments that may use a different number of partitions.

TABLE 2

Partition Stride Interleaving for 256 bytes

1 Partition:
   Partition[2:0] = 0
2 Partitions:
   Partition[2:0] = {0, 0, PA[8] ^ PA[9] ^ PA[10] ^ PA[11] ^ PA[12] ^ PA[13]}
3 Partitions:
   Partition[2:0] = (PA[15:8] + (Partition Offset)) % 3
4 Partitions:
   Partition[2:0] = (PA[14] + PA[13:12] + PA[11:10] + PA[9:8] ) % 4
5 Partitions:
   Partition[2:0] = (PA[15:8]+(Partition Offset)) % 5
6 Partitions:
   Partition[2:0] = ((PA[15:8] + (Partition Offset)) % 6) ^ {0, 0, swz[4] swz[3] swz[2] swz[1] swz[0]})

When the 1024 byte partition stride is used the interleaving may be specified as shown by the code in TABLE 3, where swz8[4:0]=int(PA[n-1:8]/6)%32 and swz10[4:0]=int(PA[n-1:10]/6)%32.

TABLE 3

Partition Stride Interleaving for 1024 bytes

1 Partition:
   Partition[2:0] = 0
2 Partitions:
   Partition[2:0] = {0, 0, PA[10] ^ PA[11] ^ PA[12] ^ PA[13]}
3 Partitions:
   Partition[2:0] = if (problem page crossing region)
   then
     (PA[15:8] + (Partition Offset)) % 3
   else
     (PA[15:10] + (Partition Offset)) % 3
4 Partitions:
   Partition[2:0] = (PA[14] + PA[13:12] + PA[11:10] ) % 4
5 Partitions:
   Partition[2:0] = if (problem page crossing region)
   then
     (PA[15:8] + (Partition Offset)) % 5
   else
     (PA[15:10] + (Partition Offset)) % 5

TABLE 3-continued

Partition Stride Interleaving for 1024 bytes

```
6 Partitions:
   Partition[2:0] =
   if (problem page crossing region)
      then
         ((PA[15:8]+ (Partition Offset)) % 6) ^ {0, 0,
         swz8[4] swz8[3] swz8[2] swz8[1] swz8[0]}
      else
         ((PA[15:10]+ (Partition Offset)) % 6) ^ {0, 0,
         swz10[4] swz10[3] swz10[2] swz10[1] swz10[0]}
```

Figure 7:
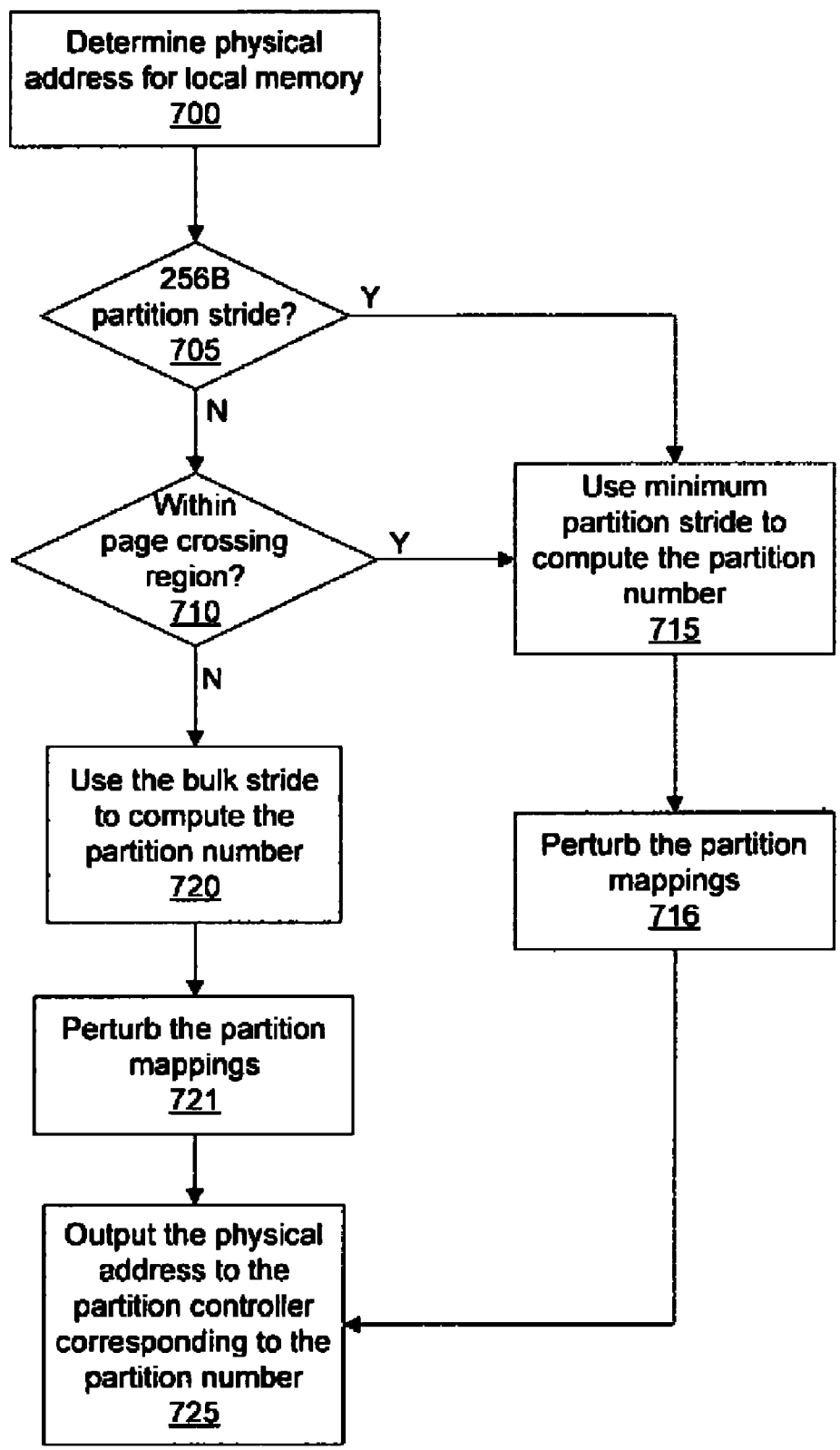
FIG. 7 illustrates a flow diagram of an exemplary method of determining the partition number and partition interleaving using the physical address in accordance with one or more aspects of the present invention.

FIG. 7 illustrates a flow diagram of an exemplary method of determining the partition number and partition interleaving using the physical address, in accordance with one or more aspects of the present invention. Steps 700, 705, 710, 715, and 720 correspond to steps 500, 505, 510, 515, and 520, respectively and are completed as previously described. In step 716 virtual to physical address mapping unit 230 uses a hash function to perturb the partition mapping within each DRAM bank for improved memory access bandwidth. Specifically, one of the computations listed in TABLE 2 is used to compute the partition number based on the physical address, number of partitions, and partition offset. In step 721 virtual to physical address mapping unit 230 also uses a hash function to perturb the partition mapping within each DRAM bank for improved memory access bandwidth. Specifically, one of the computations listed in TABLE 3 is used to compute the partition number based on the physical address, number of partitions, and partition offset. Step 725 corresponds to step 525 of FIG. 5 and is completed as previously described.

Persons skilled in the art will appreciate that any system configured to perform the method steps of FIG. 5 or 7, or their equivalents, is within the scope of the present invention. Systems and methods for addressing memory where data is interleaved across different banks using different interleaving granularities improve graphics memory bandwidth by distributing graphics data for efficient access during rendering. Various partition strides may be selected to modify the number of sequential addresses mapped to each DRAM and change the interleaving granularity. Memory aliasing problems are avoided by using the minimum partition stride for physical addresses within a page crossing region. Additionally, the partition stride interleaving may be modified when the number of partitions is divisible by 2 to perturb the partition mapping and improve memory access performance for accesses that are horizontally aligned in image space.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of addressing a memory to avoid memory aliasing in an addressing scheme for the memory, wherein the memory is constructed of multiple partitions, the method comprising:

allocating a first virtual memory page having a first partition stride and a second virtual memory page having a second partition stride to access graphics surfaces stored in the memory, wherein the first partition stride specifies a first portion size of contiguous memory into which each partition of the memory mapped to the first virtual memory page is interleaved across dynamic random access memory (DRAM) banks of the memory and the second partition stride differs from the first partition stride and specifies a second portion size of contiguous memory into which each partition of the memory mapped to the second virtual memory page is interleaved across the DRAM banks of the memory;

determining a physical address for a virtual address;

determining that the physical address lies within a page crossing region of a partition of the memory, wherein the page crossing region is a DRAM bank that is intersected by a boundary between the first virtual memory page and the second virtual memory page;

computing a partition number corresponding to the partition of the page crossing region using a minimum partition stride supported by the memory addressing scheme; and outputting the physical address to a partition controller to access data in the partition, wherein the partition controller is coupled to the partition and identified by the partition number.

2. The method of claim 1, wherein each one of the multiple partitions is constructed of a pair of dynamic random access memories (DRAMs) configured to appear as a single larger memory device.

3. The method of claim 2, further comprising mapping a portion of the DRAM banks to a two-dimensional image stored in the memory as a graphics surface, wherein the portion of the DRAM banks are interleaved in image space.

4. The method of claim 2, further comprising perturbing an interleave pattern used to map portions of each one of the multiple partitions to the DRAM banks.

5. The method of claim 4, wherein the interleave pattern is perturbed so that horizontal accesses in image space access data stored in different partitions.

6. The method of claim 1, wherein the partition number is computed as (PA/PS) modulo PN, where PS is the first partition stride, PA is the physical address, and PN is a number of partitions in the multiple partitions.

7. The method of claim 1, wherein data is stored in the page crossing region in contiguous memory portions having a size of the minimum partition stride.

8. The method of claim 1, wherein one of the first partition stride or the second partition stride equals the minimum partition stride.

9. The method of claim 1, wherein the step of determining that physical address lies within the page crossing region is based on a computation of the physical address, a number of partitions in the multiple partitions, and a partition number at a start of the second virtual memory page.

10. The method of claim 1, wherein the step of determining the physical address uses a page table entry that corresponds to the virtual address and stores the first partition stride.

11. A memory addressing system configured to avoid memory aliasing, comprising:

a memory comprising multiple partitions, wherein a first virtual memory page having a first partition stride and a second virtual memory page having a second partition stride are allocated to graphics surfaces stored in the memory, and the first partition stride specifies a first portion size of contiguous memory into which each partition of the memory mapped to a first virtual memory page is interleaved across dynamic random access memory (DRAM) banks of the memory and the second partition stride differs from the first partition stride and specifies a second portion size of contiguous memory into which each partition of the memory mapped to the second virtual memory page is interleaved across the DRAM banks of the memory;

a virtual to physical address mapping unit configured to determine a physical address for a virtual address, and determine that the physical address lies within a page crossing region of a partition of the memory, wherein the page crossing region is a DRAM bank that is intersected by a boundary between the first virtual memory page and the second virtual memory page; and a partition controller configured to receive the physical address from the virtual to physical address mapping unit to access data in the partition, wherein the partition controller is coupled to the partition and identified by the partition number.

12. The system of claim 11, further comprising a pair of dynamic random access memories (DRAMs) coupled to the partition controller and configured to appear as a single larger memory device.

13. The system of claim 12, wherein a portion of the DRAM banks are mapped to a two-dimensional image stored in the memory as a graphics surface and the portion of the DRAM banks are interleaved in image space.

14. The system of claim 12, wherein the virtual to physical address mapping unit is further configured to use a hash function to perturb an interleave pattern used to map portions of each one of the multiple partitions to the DRAM banks.

15. The system of claim 14, wherein the interleave pattern is perturbed so that horizontal accesses in image space access data stored in different partitions.

16. The system of claim 11, wherein the virtual to physical address mapping unit is further configured to compute the partition as (PA/PS) modulo PN, where PS is the first partition stride, PA is the physical address, and PN is a number of partitions in the multiple partitions.

17. The system of claim 11, wherein the virtual to physical address mapping unit is further configured to compute the page crossing region based on the physical address, a number of partitions in the multiple partitions, and a partition number at a start of the second virtual memory page.

18. The system of claim 11, further comprising a page table configured to store information used by the virtual to physical address mapping unit to translate the virtual address into the physical address.

19. The system of claim 11, wherein data is stored in the page crossing region in contiguous memory portions having a size of the minimum partition stride.

20. The system of claim 11, wherein one of the first partition stride or the second partition stride equals the minimum partition stride.

* * * * *